United States Patent Office 3,423,424
Patented Jan. 21, 1969

3,423,424
3-PHENYL-4-DIALKYLAMINOALKYL-PYRAZOL-5-OL COMPOUNDS
Donald L. Trepanier, Indianapolis, Ind., assignor to The Dow Chemical Company, Midland, Mich., a corporation of Delaware
No Drawing. Filed Sept. 28, 1966, Ser. No. 582,490
U.S. Cl. 260—310            2 Claims
Int. Cl. C07d 49/18; A01n 9/22, 23/00

ABSTRACT OF THE DISCLOSURE 3-phenyl-4-dialkylaminoalkyl-pyrazol-5-ol compounds are prepared by the reaction of an α-benzoyl-ω-dialkylamino acid ester with hydrazine. The novel compounds are useful as anthelmintic agents as piscicides.

---

This invention is concerned with novel 3-phenyl-4-dialkylaminoalkyl-pyrazol-5-ols and their acid addition salts and is particularly directed to compounds corresponding to the formula:

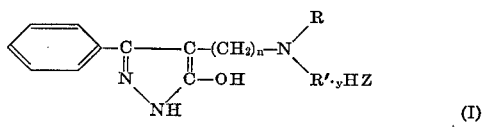

(I)

In the present specification and claims, R and R' each independently represent methyl, ethyl and propyl, Z represents chlorine or bromine, n represents one of the integers 2 and 3 and y represents one of the intergers zero and 1. The pyrazol-5-ols of the invention are solids or viscous oils which are soluble in ethanol, propanol and acetone, less soluble in ether and water and only slightly soluble in benzene and hexane. The hydrohalides of the novel pyrazol-5-ols are crystalline solids which are soluble in water and acetone and slightly soluble in benzene and ether. The novel compounds have been found to be useful as anthelmintic agents and piscicides.

The novel compounds are prepared by the reaction of an α-benzoyl-ω-dialkylamino acid ester corresponding to the formula

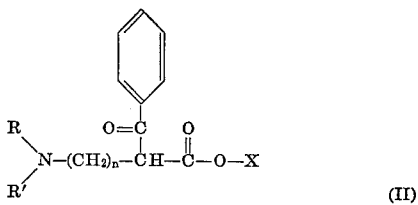

(II)

wherein X represents methyl, ethyl, propyl or butyl, with hydrazine. The reaction proceeds with heating, preferably under an inert atmosphere at temperatures from about 110° to 190° C. and preferably at the boiling point of the reaction mixture. The reactants can be combined in the presence of an inert solvent such as ethanol, but they are preferably contacted without a solvent. The reaction consumes one mole of ester for each mole of hydrazine, and the use of the reactants in substantially equimolar proportions is preferred.

In a convenient procedure, hydrazine and an ester corresponding to Formula II are mixed together and heated to reflux temperature while nitrogen is directed over the reaction mixture to displace oxygen. The mixture is refluxed for a period of time, usually from about 3 to about 24 hours after which the pyrazol-5-ol product remains as a residue. The nitrogen is removed and the pyrazol-5-ol product can be purified by such conventional procedures as washing and recrystallization.

The hydrohalides of the novel pyrazol-5-ols can be prepared by dissolving the pyrazol-5-ol in a solvent such as ethanol or isopropanol and treating the solution with ethereal hydrogen chloride or ethereal hydrogen bromide. The hydrohalide product precipitates from the solution and can be purified by such conventional procedures as recrystallization.

The following examples illustrate the invention but are not to be construed as limiting the same.

EXAMPLE 1

Ethyl 2-benzoyl - 4 - (diisopropylamino)-butyrate (30 grams; 0.094 mole) was mixed with hydrazine (3 grams; 0.094 mole) in a vessel and the mixture refluxed without stirring in a nitrogen atmosphere. The mixture was refluxed by heating in an oil bath at a temperature of 110° C. for 20 hours and 160°–190° C. for 2 hours. The viscous oil which remained in the reaction vessel was dissolved in ethanol and treated with ether and ethereal hydrogen chloride. Nine grams of a crystalline solid precipitated immediately and the mother liquor was concentrated twice to yield additional quantities of 16 grams and 3 grams, respectively. The three portions of solid material were recrystallized by dissolving in ethanol and adding ether to the solution. The three portions of recrystallized solid were combined and recrystallized again using ethanol and ether. The 4-(2-diisopropylaminoethyl)-3-phenyl-pyrazol-5-ol hydrochloride product was found to melt at 263°–264° C. and was found by analysts to have carbon, hydrogen and nitrogen contents of 62.92, 8.28 and 12.83 percent, respectively, as compared with the theoretical contents of 63.03, 8.09 and 12.97 percent, respectively, calculated for the named structure.

In substantially the same procedure, 4-(2-dimethylaminoethyl)-3-phenyl-pyrazol-5-ol hydrobromide, having a molecular weight of 312.5, is prepared by heating hydrazine with an equimolar proportion of butyl 2-benzoyl-4-(dimethylamino)-butyrate, and treating the product of this reaction with ethereal hydrogen bromide.

EXAMPLE 2

Ethyl 2 - benzoyl-5-(diethylamino) - pentanoate (100 grams; 0.328 mole) and hydrazine (10.5 grams; 0.328 mole) were mixed and refluxed for 24 hours in a nitrogen atmosphere. The resulting viscous oil was mixed with about 50 milliliters of anhydrous ether and a yellowish-white solid formed. The solid was separated by filtration, washed twice with ether and recrystallized from a mixture of acetone and ether. The 4-(3-diethylaminopropyl)-3-phenyl-pyrazol-5-ol product was found to melt in the range of 110°–122° C.

In substantially the same procedure, a second quantity of 4-(3-diethylaminopropyl)-3-phenyl-pyrazol-5-ol was prepared using 30 grams of the pentanoate and 3 grams of hydrazine, heating the mixture at 110°–130° C. for two hours and thereafter at 160°–180° C. for three hours. After prolonged storage at room temperature, the oily residue was treated with ethanol, ether and ethereal hydrogen chloride. The 4-(3-diethylaminopropyl)-3-phenyl-pyrazol-5-ol hydrochloride product precipitated and was separated by filtration as a white solid. This solid was recrystallized from ethanol and ether twice and the recrystallized hydrochloride found to melt at 208°–210° C. with decomposition.

EXAMPLE 3

Ethyl 2 - benzoyl - 4 - (diethylamino) - butyrate (10 grams; 0.034 mole) and hydrazine (1 gram; 0.031 mole) were mixed together and heated in an oil bath at 150° C. for three hours under a nitrogen atmosphere. The nitrogen was removed and the resulting clear, gummy solid covered with 150 milliliters of benzene and heated. The solid dissolved when the benzene was boiled and recrystallized upon cooling. The 4-(2-diethylaminoethyl)-3-phenyl-pyrazol-5-ol product was found to melt at 72°–76° C. The pyrazol-5-ol product was again dissolved in hot benzene, the solution was cooled, hexane was added and the hexane and benzene removed by evaporation to leave the pyrazol-5-ol product as an oily residue. The oil was dissolved in isopropyl alcohol, and ether and ethereal hydrogen chloride were added to the solution. A precipitate was formed which was recrystallized from ethanol and ether to produce 4-(2-diethylaminoethyl)-3-phenyl-pyrazol-5-ol hydrochloride melting at 220°–223° C. A 0.5 gram sample of the pyrazol-5-ol hydrochloride product was recrystallized a second time from ethanol and ether and was found, by analysis, to have carbon, hydrogen and nitrogen contents of 60.58, 7.74 and 13.84 percent, respectively, as compared with the theoretical contents of 60.92, 7.50 and 14.21 percent, respectively, calculated for the named structure.

The novel pyrazol-5-ol compounds are useful as anthelmintic agents. In representative operations, mice infected with tapeworms were fed a diet containing 0.06 percent of 4-(2-diethylaminoethyl)-3-phenyl-pyrazol-5-ol hydrochloride as the sole toxicant therein. The mice were fed on such medicated diets for a total of 7 successive days after which excellent control of the tapeworms was found by necropsy of the mice.

The compounds of the invention are also active as piscicides. In representative operations, substantially complete kills of northern flat-headed minnows were obtained when the fish were exposed for 24 hours in water containing 5 parts per million of 4-(2-diethylaminoethyl)-3-phenyl-pyrazol-5-ol hydrochloride as the sole toxicant therein.

The α-benzoyl-ω-dialkylamino acid esters employed as starting materials herein are described and claimed in my copending application, Ser. No. 582,515, filed concurrently herewith.

I claim:
1. 3 - phenyl-dialkylaminoalkyl-pyrazol - 5 - ol compound corresponding to the formula

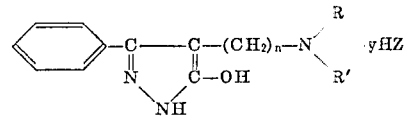

wherein R and R' each independently represent a member of the group consisting of methyl, ethyl and propyl, Z represents a member of the group consisting of chlorine and bromine, $n$ represents one of the integers 2 and 3 and $y$ represents one of the integers zero and 1.

2. The compound of claim 1 wherein the compound is 4-(2-diethylaminoethyl)-3-phenyl-pyrazol-5-ol hydrochloride.

References Cited

Pathar et al.: Chem. Abst., vol. 44, columns 3212–3 (1950).

HENRY R. JILES, *Primary Examiner.*

N. TROUSOF, *Assistant Examiner.*

U.S. Cl. X.R.

260—471; 424—273